United States Patent
Lu et al.

(10) Patent No.: US 6,941,187 B2
(45) Date of Patent: Sep. 6, 2005

(54) MULTIPLE DISCHARGE-SERVO CURVE CONTROL METHOD AND DEVICE FOR AN ELECTRICAL DISCHARGE MACHINE

(75) Inventors: Ching-Shan Lu, Taichung Hsien (TW); Yung-Feng Nien, Kaohsung (TW)

(73) Assignee: Industrial Technology Research Institute, Hsin-Chu Hsien (TW)

( * ) Notice: Subject to any disclaimer, the term of this patent is extended or adjusted under 35 U.S.C. 154(b) by 481 days.

(21) Appl. No.: 09/987,302

(22) Filed: Nov. 14, 2001

(65) Prior Publication Data

US 2003/0093175 A1 May 15, 2003

(51) Int. Cl.[7] ............................................. G06F 19/00

(52) U.S. Cl. ................... 700/162; 219/121.67

(58) Field of Search .......................................... 700/162

(56) References Cited

U.S. PATENT DOCUMENTS

| | | | | |
|---|---|---|---|---|
| RE28,564 E | * | 9/1975 | Inoue | 205/644 |
| 4,071,729 A | * | 1/1978 | Bell, Jr. | 219/69.13 |
| 4,365,300 A | * | 12/1982 | Johanson et al. | 700/162 |
| 5,396,040 A | * | 3/1995 | Girardin | 219/69.15 |
| 5,589,086 A | * | 12/1996 | Sawada et al. | 219/69.16 |
| 6,643,560 B2 | * | 11/2003 | Shimomura | 700/160 |

* cited by examiner

*Primary Examiner*—Leo Picard
*Assistant Examiner*—Sheela S. Rao
(74) *Attorney, Agent, or Firm*—Bacon & Thomas, PLLC

(57) ABSTRACT

A discharge-servo curve control method and device for an electrical discharge machine enables multiple discharge-servo curves to be chosen during a machining process in real-time. The control device includes a storage unit, a setting unit, a reading unit, a program unit and an instruction-judging unit capable of swapping control during execution of the program whenever a discharge-servo curve instruction is encountered.

5 Claims, 7 Drawing Sheets

MULTIPLE DISCHARGE-SERVO CURVE CONTROL METHOD AND DEVICE FOR AN ELECTRICAL DISCHARGE MACHINE

BACKGROUND OF INVENTION

1. Field of Invention

This invention relates to a control method and device for an electrical discharge machine capable of employing multiple discharge-servo curves, and especially to a numerical control method used by the electrical discharge machine to choose multiple servo curves by calling a servo curve instruction during the machining process. This application can be used for any electrical discharge machine, including a drilling electrical discharge machine, and a wire-cut electrical discharge machine.

2. Description of The Prior Art

An Electrical Discharge Machine (EDM) utilizes the sparking generated between the electrode and workpiece to melt as well as evaporate material, under a locally instant high temperature condition, to achieve the cutting result, which is a non-traditional machining technology. Even though EDM has already been adopted to cut a more complex and higher precision product by industries worldwide, the precision control technique of EDM is still not good enough and needs to be improved The gap-voltage control-loop of the electrical discharge machine determines the suitable cutting speed by real-time measurement of the movement and calculation of the deviation of the gap-voltage. FIG. 1 is a functional block diagram of a known gap-voltage control loop of the electrical discharge machine, which is arranged to calculate the gap-voltage difference between the real measurement and the operator inputs, and then to output the cutting speed after the outcomes are processed through the servo curve controller and the deviation controller. Furthermore, the positioning control-loop guides the electrical discharge machine to work on the cutting according to a position command integrated by the integrator. Finally, the positioning controlloop issues a real gap dimension for calculating the gap deviation by subtracting the real gap dimension from an original operator-input gap value, calculates the gap-voltage according to the gap deviation using the gap-voltage converter, and then subtracts that gap-voltage from the reference operator-input gap-voltage. The next gap-voltage control cycle is then carried out in an iterative manner, the cutting speed again corresponding to the gap-voltage deviation, which is calculated by the internally used gap-voltage deviation and cutting speed control curve of the servo curve controller. The combined gap-voltage deviation and cutting speed control curve are generally referred-to as a discharge-servo curve. As shown in the FIG. 2, the discharge-servo curve is built on the relationship of the gap-voltage deviation and the cutting speed, and contains a nonlinear discharge-servo curve 1$a$ and a linear discharge-servo curve 1$b$.

The servo curve controller of the electrical discharge machine chooses a discharge-servo curve by the control software device of a known electrical discharge machine software structure, as shown in FIG. 3. A flowchart of a known discharge-servo curve control method is shown in FIG. 4. Before initiating the program, the discharge-servo curve is set via the CNC control panel and the discharge-servo curve data is recorded within the servo curve controller, and then a cutting process is carried-out according to the discharge-servo curve data which is recorded within the servo curve controller as soon as the program is started.

The required cutting speed differs during the workpiece cutting process, as a result of different machining environments resulting from factors such as a different material of electrode, workpiece, cutting solution, and coarse or fine process. If the known discharge-servo curve control method is adopted, the executing program has to be stopped in order to exchange discharge-servo curve data, and returned to the step of setting the discharge-servo curve on the CNC control panel for swapping the record within the servo curve controller and the discharge-servo curve data Therefore, it is really not convenient to the case of a single workpiece with servo curves. How to allow an electrical discharge machine arbitrarily to choose the discharge-servo curve during the real cutting process is a significant problem.

SUMMARY OF THE INVENTION

The main purpose of this invention is to solve the aforesaid defects by providing a servo curve control method and device for an electrical discharge machine that allows the operator to swap different discharge servo curves in accordance with the actual process requirements during operation of the electrical discharge machine, and by further to providing a one-step process for arbitrarily choosing the servo curves.

DETAILED DESCRIPTION OF THE PREFERRED EMBODIMENTS

Figure 1:
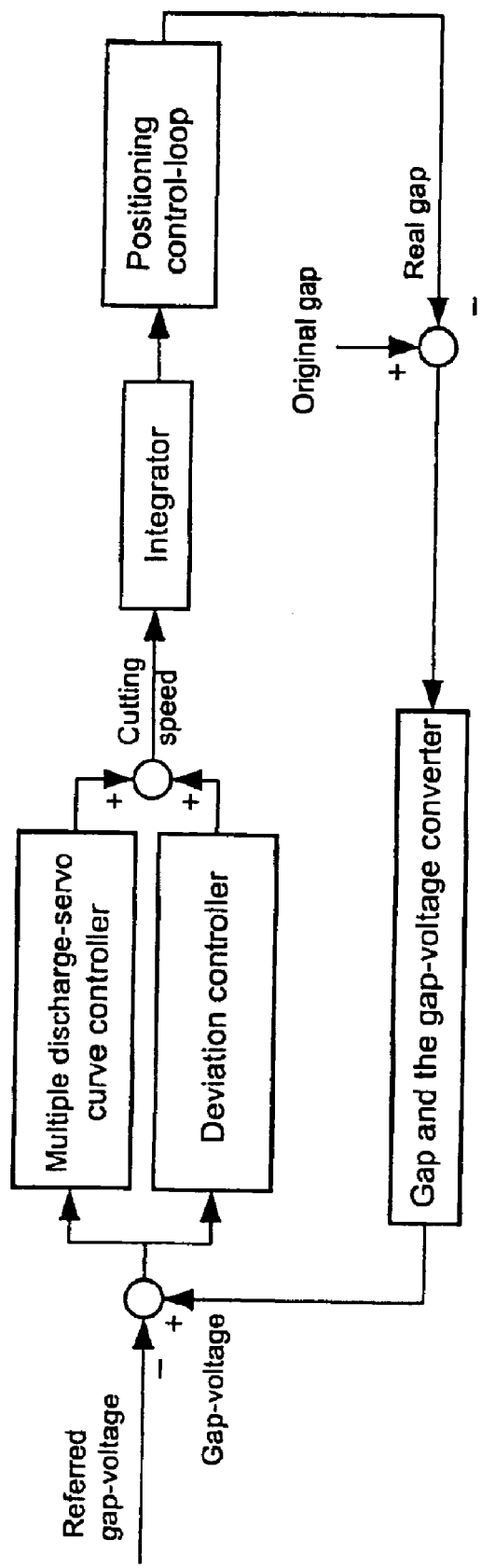
FIG. 1 is a functional block diagram of a known gap-voltage control loop for an electrical discharge machine.
Figure 2:
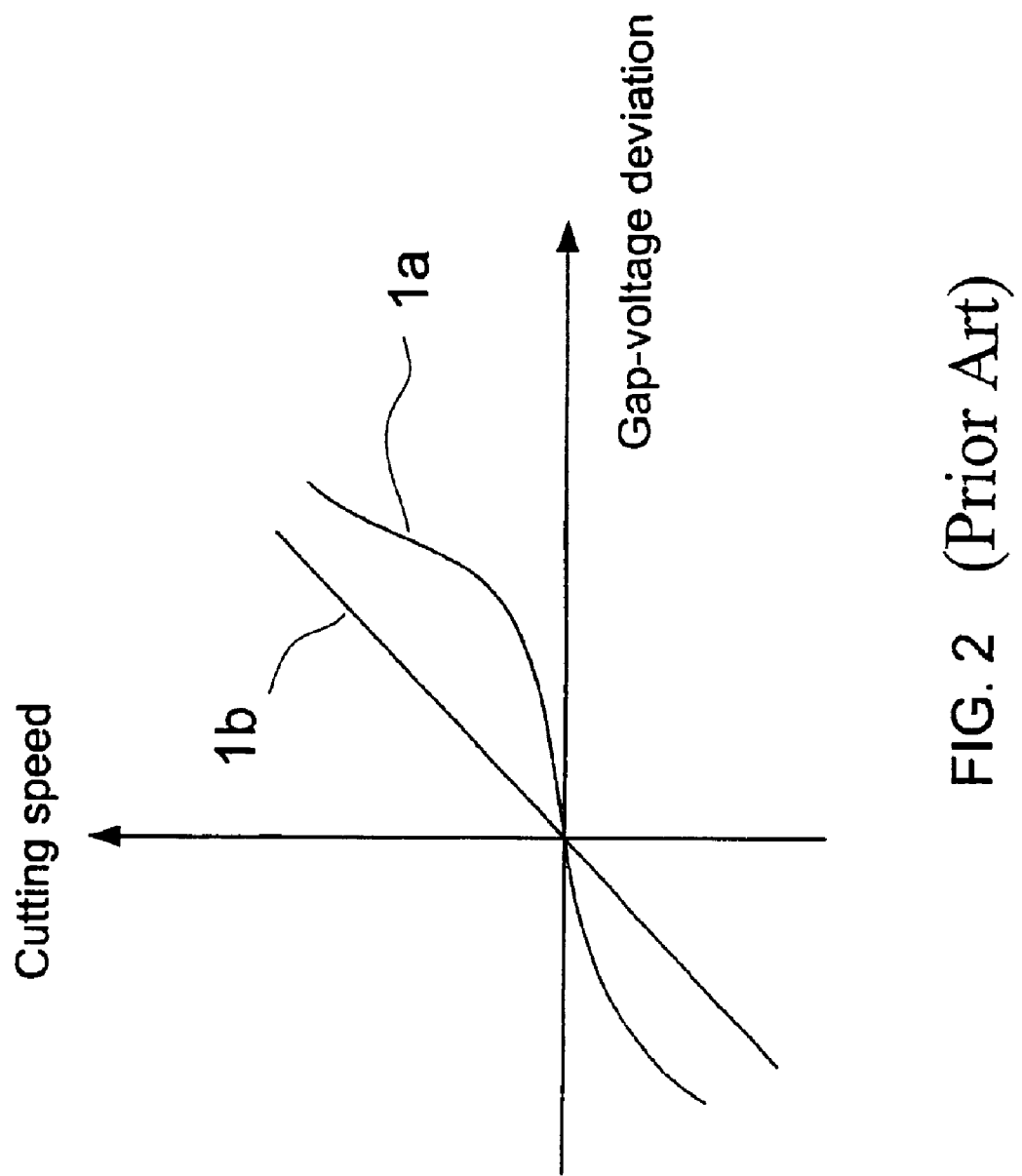
FIG. 2 is a plot of the discharge-servo curve.
Figure 3:
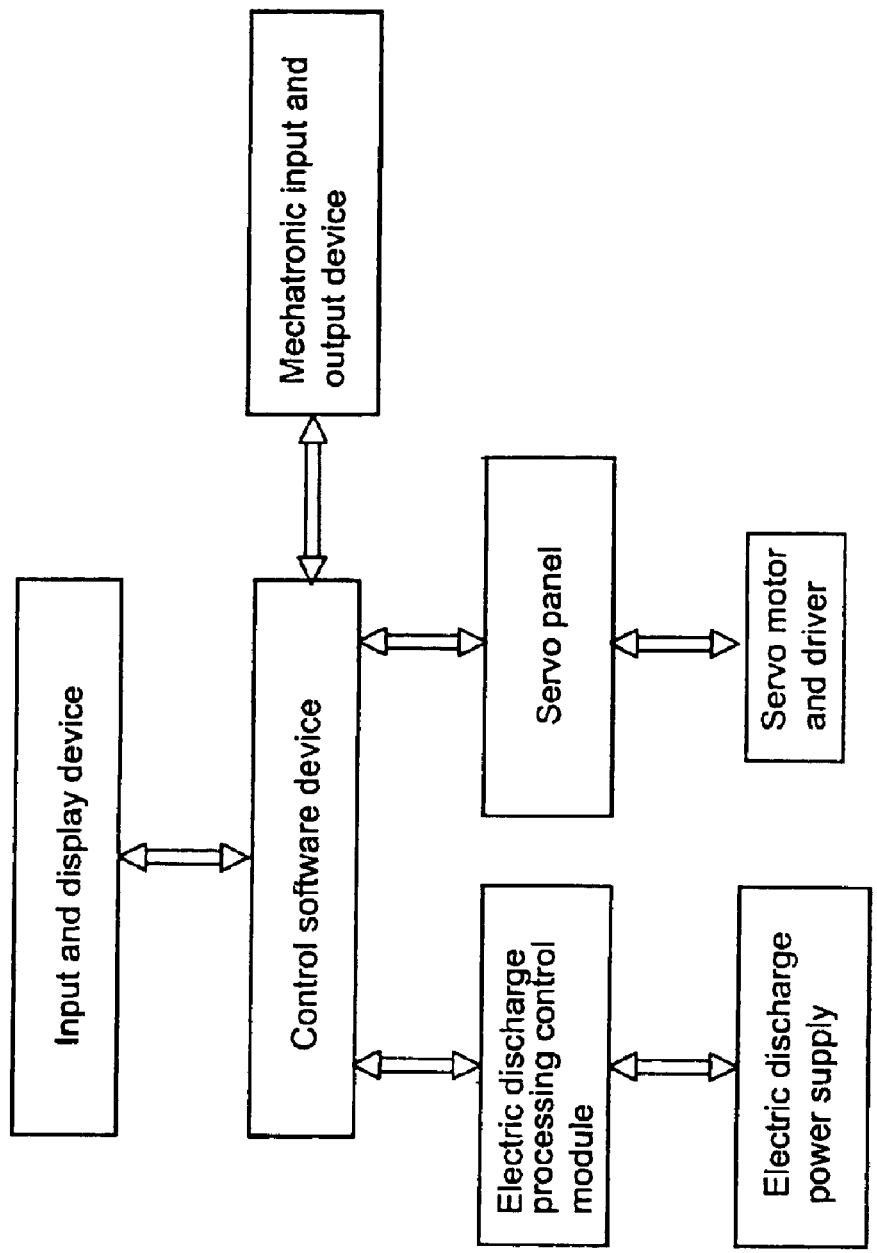
FIG. 3 illustrates a configuration of a known electrical discharge machine software structure.
Figure 4:
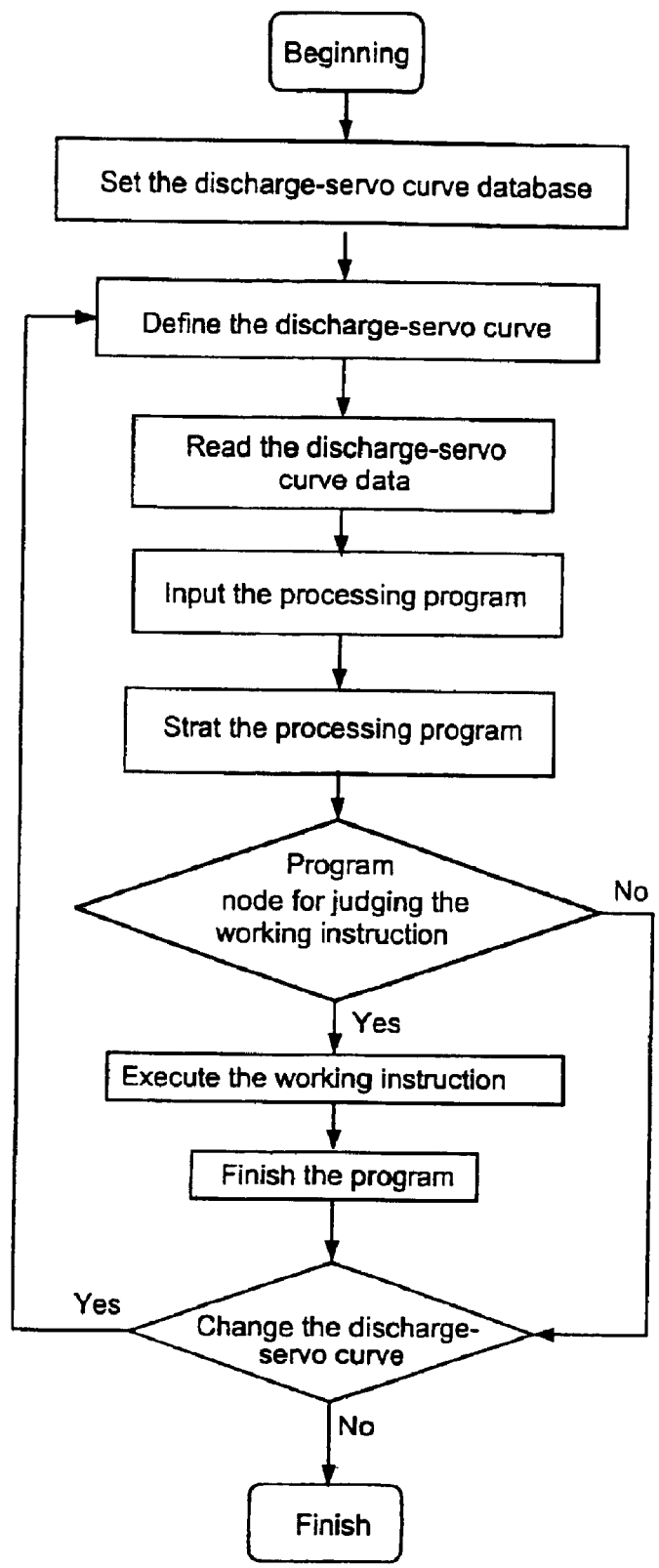
FIG. 4 is a flowchart of a known discharge-servo curve control method.
Figure 5:
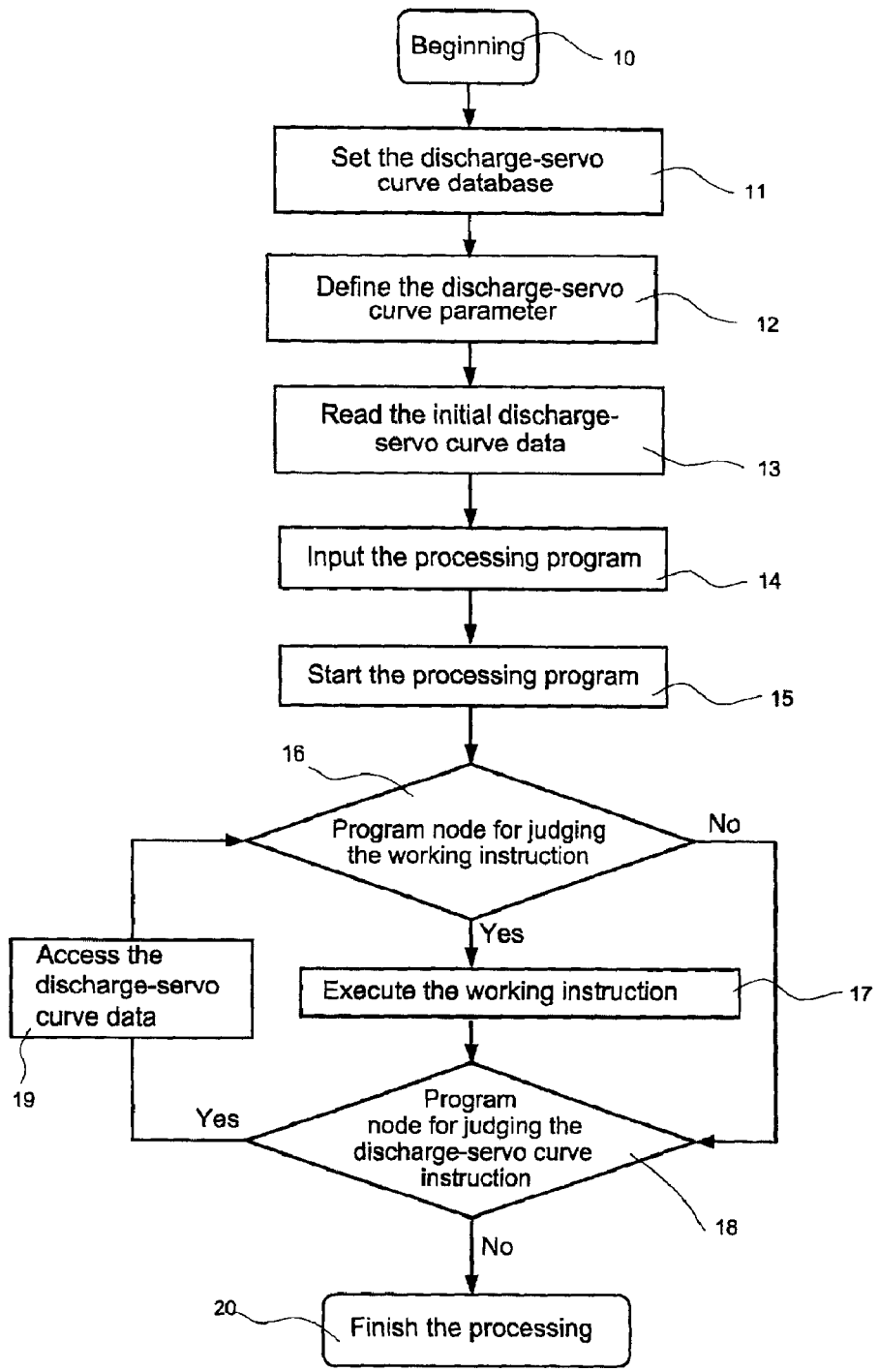
FIG. 5 is a flowchart of a preferred servo curve control method for an electrical discharge machine.

The invention is a servo curve control method and device for electrical discharge machine. A flowchart of a preferred embodiment of the servo curve control method is shown in FIG. 5. First, the discharge-servo curve database is set in step 11 whenever the beginning command is issued (step 10), wherein each gap-voltage deviation and its corresponded cutting speed of the discharge-servo curve are input from the CNC control panel in order to set up the servo curve database. The algorithm of the discharge-servo curve is constructed on the records of the gap-voltage deviation and the cutting speed measured under real optimal processing conditions. Moreover, the discharge-curve is correlated with the collected gap-voltage deviation and its cutting speed for different electrode materials, different workpiece materials, and different cutting solutions. A polynomial equation is expressed with those gap-voltage deviations and its corresponded cutting speeds as:

$$f(e) = a_0 + a_1 xe + a_2 x + e_2 + a_3 xe_3 + a_4 xe_4 + A + a_n xe_n$$

where f(e) is the cutting speed and e is gap-voltage deviation. The aforesaid polynomial equation is called the discharge-servo curve equation, and it is used to set up the discharge-servo curve with lots of different processing conditions. Moreover, the discharge-servo curve parameter 12 is first set in the discharge-servo curve database to correspond to a numerical value of the discharge-servo curve parameter; such that the 1st discharge-servo curve corresponds to a numerical value of the discharge-servo curve parameter that is set as "1" in the discharge-servo curve database, and then the discharge-servo curve parameter's value is set to be that given by the appropriate discharge-servo curve, i.e., the discharge-servo curve required for a particular processing environment. After all the initial discharge-servo curve data 13 is read, based on the discharge-servo curve parameter's value, then it's the corresponded discharge-servo curve data from the discharge servo curve database are read and recorded into the servo curve controller. The processing program is input in step 14 after setting and reading the discharge-servo curve data for the machining required, by using the CNC control panel to key in each working instruction and discharge-servo curve instruction for processing program setup. Once the processing program been edited, it is started in step 15. Subsequently, a program node for judging the working instruction is used in step 16 to determine: when the program node is a working instruction and, is so, the working instruction is executed in step 17, using the discharge-servo curve data of the internal record of the servo curve controller to execute the cutting process, or when the program node isn't a working instruction, the program node for judging the discharge-servo curve instruction is executed in step 18. Moreover, when the program node is the instruction for accessing the nth discharge-servo curve data (referred-to as "discharge machining NO.n"), the discharge-servo curve data is accessed in step 19, and the nth discharge-servo curve data is retrieved from the discharge-servo curve database and stored within the servo curve controller. When the program node isn't a discharge-servo curve instruction, processing is finished. The discharge-servo curve instruction of the processing program determines how to call the discharge-servo curve while the processing program is running. Therefore, this invention allow the operator to swap the different discharge-servo curves according actual conditions that arise during the processing and to achieve a one-step process to arbitrarily choose from among the servo curves.

Figure 6:
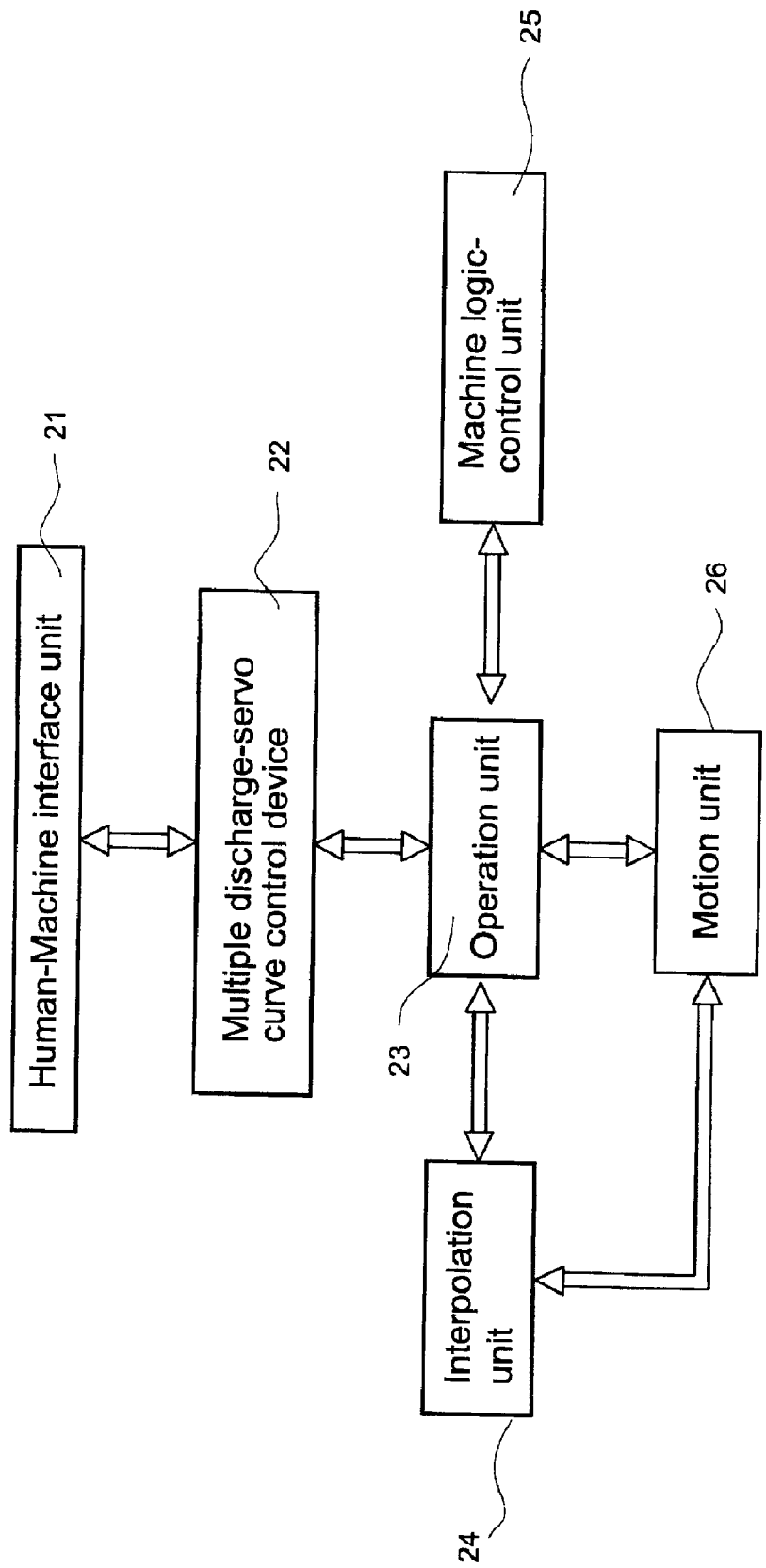
FIG. 6 is a block diagram of the preferred control software structure.

During processing, the software control device is designed to control the discharge-servo curve, as shown in FIG. 6, by means of a human-machine interface unit 21, a servo curve control device 22, an operation unit 23, an interpolation unit 24, a machine logic-control unit 25 and a motion unit 26.

Figure 7:
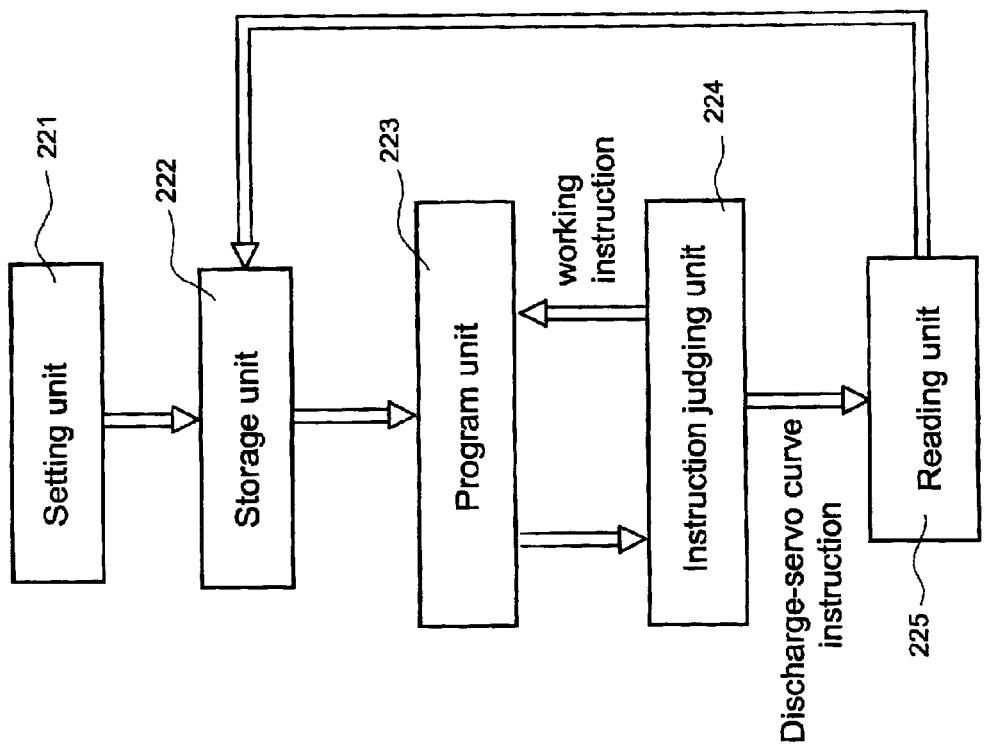
FIG. 7 illustrates a configuration of a preferred servo curve control device for an electrical discharge machine.

As shown in FIG. 7, the preferred servo curve control device 22 for electrical discharge machine includes a setting unit 221, a storage unit 222, a program unit 223, an instruction judging unit 224 and a reading unit 225, wherein the storage unit 222 is used to store the discharge-servo curve data, and the setting unit 221 is used to set the parameter value of the discharge-servo curve. Referring to the parameter value of the discharge-servo curve that is kept in the setting unit 221, the discharge-servo curve data from the storage unit 222 is read by accessing the storage unit through the reading unit 225. When the reading process is over, the working instruction is edited and the discharge-servo curve instruction of the processing program starts the processing program, at which time the execution of the processing program is carried out in accordance with the discharge-servo curve data read from the reading unit 225. Whenever the processing program is started, the instruction-judging unit 224 will judge whether the program node is either a working instruction or a discharge-servo curve instruction when the program node is a discharge-servo curve instruction, which is edited by the program unit 223, different discharge servo curve data are swapped according actual processing conditions during the processing program execution to achieve a one-step process capable of arbitrarily choosing servo curves. It will be appreciated that the above examples are exemplary in nature, and not intended to limit the invention, which are defined solely by the appended claims. Any modification and/or adjustment of the invention that may occur to those skilled in the art and that is within the scope of the claims should be included within the scope of the invention.

What is claimed is:

1. A multiple discharge-servo curve control method for an electrical discharge machine, which comprises the steps of:
   (1) constructing discharge-servo curves inputting gap-voltage deviation and cutting speed records obtained under different cutting conditions, and pre-storing the discharge-servo curves in a discharge-servo curve database;
   (2) retrieving an initial one of said discharge-servo curves and performing a cutting procedure under control of a processing control program by referring to said initial one of said discharge-servo curves;
   (3) adding a discharge-servo curve instruction to said processing control program, said discharge-servo control instruction specifying an nth discharge-servo curve;
   (4) when the processing control program detects said discharge-servo curve instruction, retrieving said nth discharge-servo curve from said database;
   (5) swapping said nth discharge-servo curve for said initial one of said discharge-servo curves and continuing said cutting procedure under control of the processing control program by referring to said nth discharge-servo curve.

2. A multiple discharge-servo curve control method of electrical discharge machine as claimed in claim 1, wherein said different conditions involve different electrode-materials.

3. A multiple discharge-servo curve control method of electrical discharge machine as claimed in claim 1, wherein said different conditions involve different work-piece materials.

4. A multiple discharge-servo curve control method of electrical discharge machine as claimed in claim 1, wherein said different conditions involve different cutting solution-materials.

5. A multiple discharge-servo curve control device of electrical discharge machine, comprising:
   a storage unit arranged to pre-store discharge-servo curve data;
   a setting unit, which sets the numerical value of discharge-servo curve parameter,
   a reading unit connected to the storage unit, which retrieves the pre-stored discharge-servo curve data from the storage unit in according with the numerical value of discharge-servo curve parameter defined in the setting unit;
   a program unit, which executes a machining program to control work-piece machining based on a first set of discharge-servo curve data; and
   an instruction-judging unit connected to the program unit and the reading unit, the instruction-judging unit being arranged to detect a discharge-servo curve instruction in the machining program, retrieve designated discharge-servo curve data, and swap the retrieved discharge-servo curve data for the first set of discharge-servo curve data to match real machining needs.

* * * * *